May 22, 1956 S. OSSINO 2,746,232
POLE SUPPORTED FRUIT PICKER WITH PIVOTED CUTTER
Filed Dec. 23, 1954 2 Sheets-Sheet 2
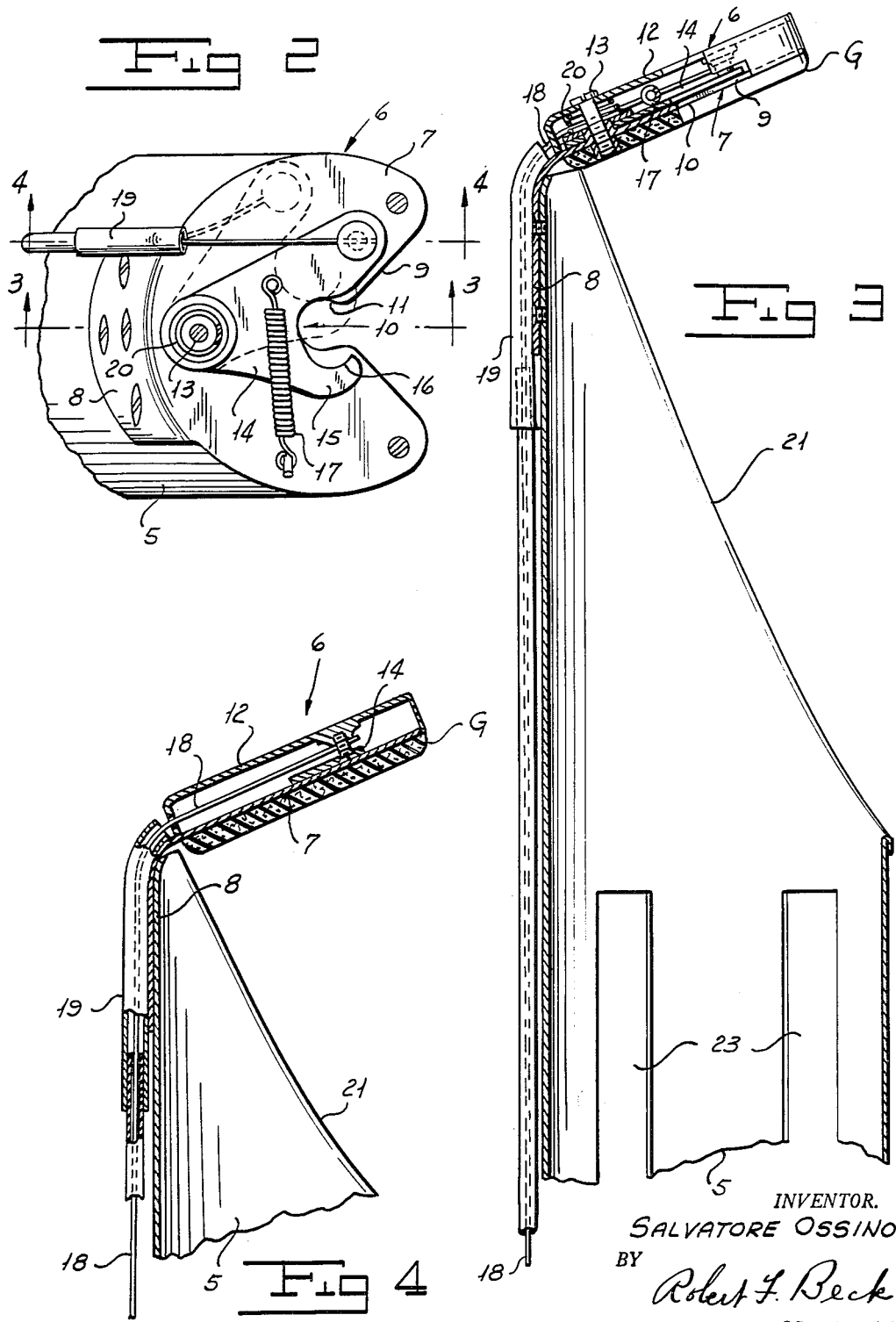
INVENTOR.
SALVATORE OSSINO
BY
Robert F. Beck
ATTORNEY

United States Patent Office 2,746,232
Patented May 22, 1956

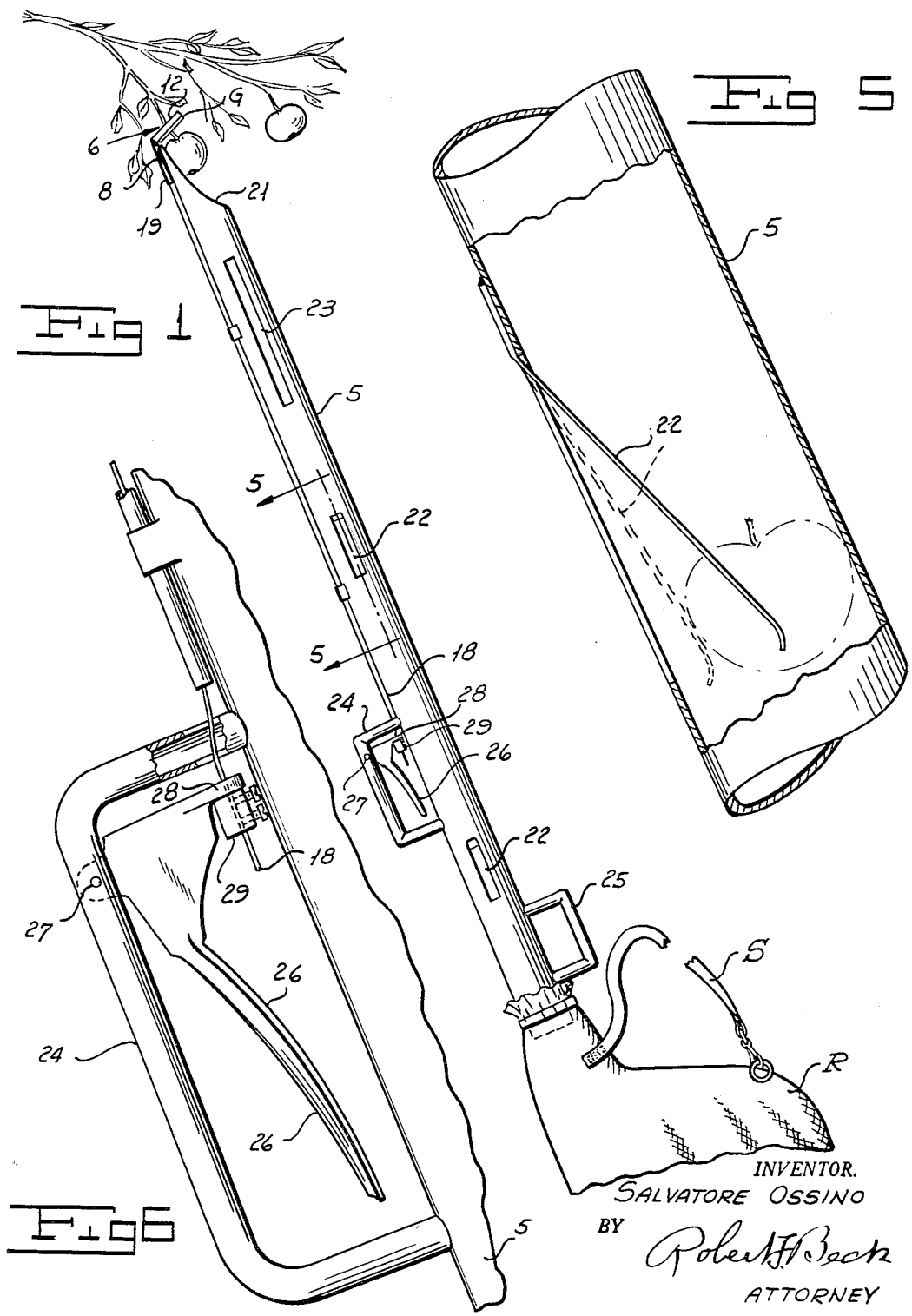

2,746,232

POLE SUPPORTED FRUIT PICKER WITH PIVOTED CUTTER

Salvatore Ossino, Totowa, N. J.

Application December 23, 1954, Serial No. 477,310

2 Claims. (Cl. 56—336)

My invention relates to fruit pickers and has as one of the objects thereof the provision of a fruit picker equipped with means for clipping the fruit from a tree and conveying the clipped fruit to a suitable receptacle without injury to the fruit.

Another object of my invention is to provide a device of the foregoing described character wherein the conveying means for conveying the fruit is constructed in a manner to permit its fruit-receiving end to be readily positioned in close proximity to the fruit to be clipped thus insuring reception of the fruit therein without injury.

An important object of my invention is to provide a device of the foregoing described character which is simple in construction, durable in use, efficient in operation, economical in manufacture and which readily lends itself to the expeditious picking or gathering of fruit of various sizes within a preestablished size range.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

Figure 1 is a fragmentary side elevation of my invention illustrating the same in position for clipping fruit from a tree.

Figure 2 is an enlarged top plan view of the clipping mechanism with the cover removed.

Figure 3 is an enlarged detail longitudinal sectional view of the upper end of the device taken substantially on the line 3—3 of Figure 2.

Figure 4 is a detail sectional view taken on the line 4—4 of Figure 2.

Figure 5 is an enlarged elevational view of the conveyor with parts broken away and shown in section.

Figure 6 is an enlarged detail side elevation, partly in section, of the trigger for operating the clipping mechanism.

As illustrated in the drawings, I provide a relatively long rigid conveyor or tube 5 which has attached to its open upper end clipping mechanism 6 comprising a plate 7 extending at an angle with respect to the axis of the tube 5 and formed on its lower end with a flange 8 secured to one side of the upper end of the tube by means of rivets or the like. The plate 7 is formed on its front portion with inwardly converging spaced edges defining a somewhat V-shaped stem guiding slot 9, said edges merging at their base in a semicircular stem receiving opening 10 disposed substantially centrally over the upper end of the tube and communicating with the slot 9. One of the aforementioned edges is provided with a sharpened portion disposed about the opening 10 to provide a cutting edge 11.

The plate 7 has mounted thereover a cover 12 secured thereto by means of screws and including a pivot screw 13, the latter constituting a pivot for a movable cutter blade 14 mounted between the plate 7 and the cover 12. The blade 14 is formed with a hook-shaped portion 15 having a cutting edge 16 adapted to cooperate with the cutting edge 11 formed about the opening 10 to effect clipping or severing of the stem of a fruit when the stem is disposed within the confines of the opening 10. A coil spring 17 has its ends connected to the blade 14 and the plate 7 and normally maintains the blade in a retracted position as illustrated in full lines in Figure 2. The blade 14 has pivotally connected to another portion thereof, distally relative to the portion 15, an operating wire 18 which passes into the upper end of a guide 19 carried by the tube 5 and which wire extends downwardly of the latter. A coil spring 20 is sleeved about the screw 13 and coacts with the cover 12 to maintain the blade 14 in tensioned engagement with the plate 7 at all times, thus contributing to the efficient operation of the cutting edges 11 and 16 in clipping the stems of fruit.

The upper end of the tube terminates in a plane inclined relative to the axis of the tube, as indicated at 21, to permit the upper end to be moved laterally about fruit stemmed from a branch to position the fruit substantially within the confines of the upper end of the tube, the clipping mechanism being presented immediately over the fruit with the stem of the latter extending through the opening 10 in the manner illustrated in Figure 1. In order to check the quick descent or dropping of the fruit within the tube 5, the latter is formed with a plurality of checks or brakes 22, one of which is shown in detail in Figure 5 as comprising a relatively flat resilient member extending through a slot in the tube a relatively material distance into the tube and being secured to the latter by welding or the like. As the fruit descends within the tube, it engages the member 22 and forces the latter outwardly with the result that the speed of the fruit is checked. The tube is also provided with one or more sight openings 23 whereby the operator may easily detect any clogging of fruit, branches, etc., within the tube.

The lower end section of the tube 5 is provided with a pair of upper and lower handles 24 and 25, respectively, to permit the operator to readily hold the device and guide the cutting mechanism into operating position above the fruit. Within the confines of the handle 24 there is provided a trigger or lever 26 pivotally connected to the handle 24 as at 27 and which lever is provided with a finger 28 through which extends the lower end of the wire 18 and to which is fixed a block 29 engageable by the finger 28. Upon pivoting of the lever or trigger 26, in a direction away from the tube, the finger 28 serves to move the wire 18 downwardly with the result that the blade 14 is pivoted to effect cutting operation of the cutting edges 11 and 16 to clip or sever the stem of the fruit from the tree and thus effect removal of the fruit. The lower end of the tube has detachably secured thereto a suitable bag or receptacle R for receiving the fruit, the bag being provided with a suitable strap S or the like whereby to secure the bag to the person of the operator for convenience in moving about during operation of the device.

In use, the tube is manipulated in a manner to position the upper end beneath the fruit and preferably in engagement with the latter with the stem of the fruit extending through the opening 10 of the plate 7, whereupon the trigger is operated to effect severing of the stem, thus clipping the fruit from the tree, whereupon, the fruit gravitates downwardly through the tube 5 into the bag R and during its descent having its speed checked by means of the brakes 22. Obviously, the construction of the upper end of the tube is such as to permit it to be disposed in close proximity to or in engagement with the fruit thus preventing bruising of the fruit. Likewise, the brakes, in checking the descent of the fruit, prevents bruising as the fruit is deposited within the bag R.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations. Furthermore, in order to preclude injury to fruit having relatively short stems, the under side of the plate 7 may have secured thereto, in conformity with the shape thereof, a rubber guard G or the like and which may be removed when its use is not required.

It is obvious that the invention is not confined solely to the use herein disclosed in connection therewith as it may be utilized for any purpose to which it is adaptable. It is therefore to be understood that the invention is not limited to the specific construction as illustrated and described, as the same is only illustrative of the principles involved which are capable of extended application in various forms, and the invention comprehends all construction within the scope of the appended claims.

What I claim is:

1. In a device of the character described, a rigid conveyor tube having an open upper end terminating in a plane inclined relative to the axis of said tube to permit said upper end to be moved laterally about fruit stemmed from a branch to position the fruit substantially within the confines of said upper end, fruit stem clipping mechanism fixed to and supported by said upper end for clipping the stem of fruit for deposit within said tube when said upper end is disposed under said fruit, said mechanism including a plate extending over said upper end in spaced relation thereto and formed with inwardly converging spaced edges defining a stem guiding slot, said edges merging at their base in a semicircular stem receiving opening communicating with said slot, one of said edges having a sharpened portion disposed about said opening to thus provide a cutting edge, a cutting blade pivoted to said plate and operable across said opening and coacting with said cutting edge to effect clipping of a stem within said opening and deposit of fruit therefrom within said tube through said upper end, and blade actuating means connected to said blade for operating the latter across said opening.

2. In a device of the character described, a rigid conveyor tube having an open upper end terminating in a plane inclined relative to the axis of said tube to permit said upper end to be moved laterally about fruit stemmed from a branch to position the fruit substantially within the confines of said upper end, fruit stem clipping mechanism fixed to and supported by said upper end for clipping the stem of fruit for deposit within said tube when said upper end is disposed under said fruit, said mechanism including a plate extending over said upper end in spaced relation thereto and formed with inwardly converging spaced edges defining a stem guiding slot, said edges merging at their base in a semicircular stem receiving opening disposed substantially centrally over said upper end and communicating with said slot, one of said edges having a sharpened portion disposed about said opening to thus provide a cutting edge, a cutting blade pivoted to said plate and operable across said opening and coacting with said cutting edge to effect clipping of a stem within said opening and deposit of fruit therefrom within said tube through said upper end, blade actuating means connected to said blade for operating the latter across said opening, and a resilient guard connected to said plate adjacent said slot and above said upper end to preclude damage to fruit having a relatively short stem received in said slot.

References Cited in the file of this patent

UNITED STATES PATENTS

| 98,639 | Slane | Jan. 4, 1870 |
| 308,148 | Folsom | Nov. 18, 1884 |
| 413,710 | Davenport et al. | Oct. 29, 1889 |
| 621,509 | Truitt | Mar. 21, 1899 |
| 773,293 | Marshall | Oct. 25, 1904 |
| 1,114,318 | Vasey | Oct. 20, 1914 |
| 1,296,236 | Uhlarick | Mar. 4, 1919 |
| 2,288,682 | Crittenden | July 7, 1942 |

FOREIGN PATENTS

| 648,709 | Germany | Aug. 6, 1937 |